United States Patent [19]
Patterson et al.

[11] Patent Number: 5,375,153
[45] Date of Patent: Dec. 20, 1994

[54] COOLANT VENT FUEL ROD AND PART LENGTH FUEL ROD HAVING A REFLEX UPPER END FITTING FOR A LIGHT WATER REACTOR

[75] Inventors: John F. Patterson; George C. Cooke; Jack Yates, all of Richland, Wash.

[73] Assignee: Siemens Power Corporation, Richland, Wash.

[21] Appl. No.: 995,633

[22] Filed: Dec. 17, 1992

Related U.S. Application Data

[63] Continuation-in-part of Ser. No. 850,532, Mar. 13, 1992.

[51] Int. Cl.⁵ .............................................. G21C 3/322
[52] U.S. Cl. ................................. 376/435; 376/371; 376/443; 376/444; 376/454
[58] Field of Search ................ 376/443, 444, 435, 371, 376/373, 377, 453, 454

[56] References Cited

U.S. PATENT DOCUMENTS

| | | | |
|---|---|---|---|
| 2,998,367 | 8/1961 | Untermyer | 376/373 |
| 3,070,537 | 12/1962 | Treshow | 376/439 |
| 3,215,606 | 3/1965 | Silvester | 376/444 |
| 3,260,652 | 7/1966 | Ritz | 376/454 |
| 3,787,286 | 1/1974 | Anthony | 376/454 |
| 4,664,882 | 5/1987 | Doshi | 376/423 |
| 4,775,510 | 10/1988 | Bryan | 376/443 |
| 4,789,520 | 12/1988 | Morimoto et al. | 376/419 |
| 4,957,698 | 9/1990 | Ritter | 376/444 |
| 5,229,068 | 7/1993 | Johansson et al. | 376/371 |

FOREIGN PATENT DOCUMENTS

| | | |
|---|---|---|
| 0151969 | 8/1985 | European Pat. Off. . |
| 0505192 | 9/1992 | European Pat. Off. . |
| 0523265 | 1/1993 | European Pat. Off. . |
| 59-137886 | 8/1984 | Japan . |
| 59-180390 | 10/1984 | Japan . |
| 59-203986 | 11/1984 | Japan . |
| 60-201284 | 10/1985 | Japan . |
| 62-10695 | 1/1987 | Japan . |
| 63-144290 | 6/1988 | Japan . |
| 64-57195 | 3/1989 | Japan . |
| 1-169395 | 7/1989 | Japan . |
| 1-176986 | 7/1989 | Japan . |
| 1-269086 | 10/1989 | Japan . |
| 1-276095 | 11/1989 | Japan . |
| 3-51796 | 3/1991 | Japan . |
| 3-183990 | 8/1991 | Japan . |

*Primary Examiner*—Daniel D. Wasil
*Attorney, Agent, or Firm*—Ira Lee Zebrak

[57] ABSTRACT

An improved fuel rod is provided having a part-length fuel rod portion that improves performance with respect to typical part-length fuel rods without significant degradation of the benefits that are achieved by using such a system, e.g., improved fuel utilization, stability, and shut down margin. The present invention provides a fuel rod for a light water nuclear reactors that comprises a part-length fuel rod and an extension tube having at least one wall member defining an enclosed flow path therethrough, the extension tube being coupled to a portion of the part-length fuel rod so as to be disposed axially above the part-length fuel rod, and including at least one inlet opening, for allowing fluid that surrounds the rod and initially comprises a two phase mixture of steam and liquid, to enter the enclosed fluid path and at least one outlet opening located above the inlet opening, the extension tube includes means for separating at least some of the steam located in the fluid from the liquid located therein. The improved fuel rod allows steam to bypass the upper active portions of the fuel assembly. A nuclear fuel rod for a light water reactor having a part length fuel rod and a reflex upper end fitting which functions to separate the liquid and vapor steam portions of two phase flow.

2 Claims, 5 Drawing Sheets

COOLANT VENT FUEL ROD AND PART LENGTH FUEL ROD HAVING A REFLEX UPPER END FITTING FOR A LIGHT WATER REACTOR

This application is a continuation-in-part of U.S. Ser. No. 07/850,532 filed Mar. 13, 1992 and entitled COOLANT VENT FUEL ROD FOR A LIGHT WATER REACTOR. The disclosure of parent application, Ser. No. 07/850,532, filed Mar. 13, 1992 is hereby incorporated by reference.

BACKGROUND OF THE INVENTION

The present invention relates generally to nuclear fuel assemblies for use in nuclear reactors. More specifically, the present invention relates to a coolant vent duct for use in light water reactors, and more particularly to either a boiling water reactor or a pressurized water reactor. The coolant vent duct could be applied in conjunction with a part length fuel rod, with a water rod, with a water/fuel rod or simply by itself. In addition, the present invention relates to a part length fuel rod having an upper end fitting which functions to separate at least a portion of the liquid and the vapor portions of two phase flow.

It is known to generate large amounts of heat and energy through nuclear fission in a nuclear reactor. Energy is dissipated as heat in elongated nuclear fuel rods. Typically, a nuclear fuel assembly includes a number of nuclear fuel rods that are grouped together to form a nuclear fuel assembly. Such fuel assemblies include a number of elongated rods supported between upper and lower tie plates.

It is known in boiling water reactor (BWR) fuel designs to include within fuel assemblies part-length fuel rods. Accordingly, some of the fuel rods in a bundle are truncated at some intermediate elevation in the core. This leaves an unfilled coolant channel above that elevation. By providing a truncated fuel rod, several important benefits are achieved. For example, there is a neutronic advantage in increasing the amount of fuel in the bottom of the core as compared to the top of the core. A more axial uniformity in water to fuel ratio is thereby achieved with an associated improvement in fuel cycle costs, increased shut-down margin, reduced pressure drop (principally because of increased flow area, but decreased wetted surface also reduces the pressure drop), and increased core stability because the pressure drop reduction occurs at the top part of the bundle where two phase pressure drops are most significant.

Potentially, the part-length fuel rod could yield a small critical heat flux (CHF) benefit because of the reduced mass flux in the top part of the bundle. This potential is generally not achieved. An important factor is considered to be that the simple truncation of the part-length fuel rod results in large open subchannels that have less power density than the other subchannels in the bundle. This results in significant non-uniformities of subchannel enthalpy rises.

Effectively, the flow in the other regular subchannels is reduced by a factor greater than one would expect merely from the increase in the bundle flow area that occurs above the top end of a part length fuel rod. Mixing devices and flow strippers have been utilized in an attempt to offset this problem somewhat at the expense of added pressure drop.

A number of part length fuel rod constructions have been utilized in the prior art.

U.S. Pat. No. 4,664,882 discloses a segmented fuel and moderator rod and fuel assembly for a boiling water reactor. The segmented rod has a lower fuel region and an upper moderator region for passing coolant through the upper portion of the boiling water reactor core which is normally undermoderated. The segmented rod displaces one or more conventional fuel rods in the fuel bundle.

U.S. Pat. No. 2,998,367 discloses a core that includes short fuel rods, rods of intermediate length, and rods extending the full height of the core, immersed in light water.

U.S. Pat. No. 4,789,520 discloses in an embodiment a fuel assembly having six fuel rods, each having a short fuel effective length portion in comparison to other fuel rods that are included in order to reduce the pressure loss within the fuel assembly.

U.S. Pat. No. 4,957,698 discloses a fuel design that preferentially directs more unvoided water coolant into the upper region of the fuel assembly. This allows relatively more fuel to be placed in the lower portion of the fuel assembly. The arrangement is designed to allow moderation of neutrons in the upper portion of the assembly while preserving a higher volume of fuel in the lower portion. The larger number of fuel rods that can be used in the lower portion reduces the linear heat generation (power peaking) in the assembly.

U.S. patent application Ser. No. 07/737,859, filed on Jul. 30, 1991, entitled: "IMPROVED FUEL ASSEMBLY FOR BOILING WATER REACTORS", and assigned to the assignee of this patent application discloses, in part, a fuel assembly.

SUMMARY OF THE INVENTION

The present invention provides a coolant vent duct structure to be preferably located above a part-length fuel rod portion that improves critical heat flux (CHF) performance with respect to typical part-length fuel rods without significant degradation of the benefits that are achieved by using such a system, e.g., improved fuel utilization, stability, and shut down margin. The present invention improves CHF performance by providing a better matching of subchannel hydraulic resistance to subchannel power in the top part of the bundle for the subchannels adjacent to these rods. A reduction of active flow channel enthalpies, i.e., void fraction, in the top part of the bundle is achieved by the structure of the present invention. The inventive coolant vent duct is not limited to use above a part-length fuel rod, it may be used above a water rod or a water/fuel rod or alone.

To this end, in an embodiment, the present invention provides a duct structure that provides a hollow tube that is located above and is mechanically connected to the part-length fuel rod of a boiling water reactor fuel assembly. The duct structure can include an extension tube having at least one wall member defining an enclosed flow path therethrough, the extension tube being coupled to a portion of the part-length fuel rod so as to be disposed axially above the part-length fuel rod, and including at least one inlet opening, for allowing a portion of a fluid that surrounds the rod, that initially comprises a two phase mixture of steam and liquid, to enter the enclosed fluid path, and including at least one outlet opening located above the inlet opening, the extension tube can further include means for separating at least some of the steam located in the fluid from the liquid located therein. The structure allows steam to bypass the upper active portions of the fuel assembly.

To accomplish this separation, the means can direct liquid water from the inlet holes while allowing steam to enter, or the means can entail directing water out of the duct while permitting the steam flow to continue flowing upwards inside the duct.

In an embodiment, the duct includes a transition section and an upper section, the upper section having an outer perimeter greater than the outer perimeter of the fuel rod below. The inlet holes can be located in the upper section or the transition section or both. The upper section need not be round in cross section but preferably is round and is larger in diameter than the fuel rod below.

In one form, the duct is a circular tube that has holes drilled into it and the transition piece merely provides a mechanical connection of the lower part-length fuel rod and the upper extension tube. This arrangement has some capability for separating steam from liquid because, owing to their greater inertia, the liquid drops flowing upwards towards the inlet holes are not as readily turned into the holes as is the steam. A drawback, especially when only a small amount of flow is taken into the extension tube, is that the liquid film that is on the surface of the rod can be drawn more readily into the holes, making separation performance less than desired.

In an embodiment, the means for separating liquid from steam is located on an outer portion of the wall outside the enclosed area in juxtaposition to the inlet opening or openings. The means for separating directs liquid away from the inlet opening causing the fluid that enters an inlet opening to comprise a greater percentage of steam. For example, the means can comprise a V-shaped member extending from the outer wall upstream and adjacent to an opening.

Assembly of this invention into the fuel bundle can impose dimensional limits on the radial extent of the V-shaped members or other means for diverting liquid films and drops from the inlet holes. For example, assembly of the bundle typically begins with a skeleton consisting of the lower tie plate, tie rods, and all the spacers. The remaining rods including the structure of this invention are then inserted through the openings in the spacers. The width of the openings for those cells which will contain this invention will be only slightly greater than the outside diameter of the upper tube. Thus, the radial extent of the means for diverting liquid away from the holes is limited to fall within the square envelope of the openings in the upper spacers. Once inserted through the spacers this invention may require rotation for optimum alignment of the inlet openings relative to the surrounding subchannels.

An embodiment demonstrates that more flexibility as to the radial extent of the protruding members can be gained by locating the inlet holes into a hollow transition piece (hollow except at the bottom thereof) and which would have a local diameter (not including the protruding members) that is less than the diameter of the upper tube.

An exemplary embodiment shows a different means of achieving sufficient separation performance. The liquid diverter is located upstream (i.e., below) of a group of inlet openings and serves to divert liquid away from all the openings in this group. For simplicity, the inlet openings are in the duct and a transition connector piece serves as the diverter. This means of liquid diversion includes one or more protrusions from the minimum section of the transition connector. Generally, there will be at least one protrusion at the top as the connector expands to the diameter of the upper tube. To be effective, the protrusions must have a reasonably sharp break in their surface so that the liquid film flowing radially outwards along the face of the protrusion will depart the surface and continue to move radially away from the transition connector piece.

A double protrusion transition connector piece with a number of geometric characteristics to promote separation of liquid and steam can be utilized. The geometric characteristics are:

(1) a smooth and gradual reduction in diameter moving axially upwards along the transition connector piece from the bottom end; the diameter is decreased so the subsequent protruding surfaces present a greater diversion of the overall flow from an axial to a radial direction; the diameter reduction is gradual so that the liquid film stays attached to the surface upstream of a first protrusion;

(2) the first protrusion is shaped so that the liquid film will follow a smooth curved arc path as its flow direction is changed to have a large radial component;

(3) the first protrusion ends in a sharp break and has only a small axial extent (i.e., the transition piece diameter is again reduced); this second reduction in diameter is done purposefully so that the recirculating flow behind the separating film acts to promote radial separation by providing a recirculating stream that joins with the separating film in a smooth tangential manner; the film separates as a continuous sheet of liquid that collides with the main axial flow of liquid drops and steam; this collision imparts outward radial momentum to the liquid drops that were flowing axially so as to move liquid in general radially away from the downstream inlet openings;

(4) the second protrusion occurs as the transition connector piece is flared outwards to have the diameter of the upper tube.

In this embodiment, the first protrusion takes the form of a ring shaped tapering disk located about the small diameter section of the transition connector piece. Another approach would be to use partial or segmented rings that are displaced axially that do not have a full 360° extent at any one location. This approach can allow steam to pass more easily towards the inlet holes by flow around the ends of the liquid film sheets as opposed to having to penetrate the sheets as they start to breakup into drops.

Another approach to separate liquid from steam ahead of the inlet holes would be to use turning vanes to give an azmathal or circular component to the flow in addition to its axial component. The addition of a swirling or twisting component to the flow is a common approach to achieving separation of liquid from steam since the liquid has more of a tendency to move outwards in response to centrifugal forces than does the steam.

In another embodiment, the means for separating is located within the enclosed area of the duct, for example, the means for separating can comprise means for imparting a centrifugal force to the two phase mixture. If desired, at least two means for separating can be provided, one located within the enclosed area of the duct and the other on an outer wall portion of the duct to achieve a more complete separation of the steam from the liquid.

The present invention provides a fuel rod for a light water reactor having a part length fuel rod portion and a reflex upper end fitting for separating at least a portion of the liquid and the vapor of two phase flow. The reflex upper end fitting is disposed axially above the part length fuel rod and in contact with the downstream end of the part length fuel rod. The reflex upper end fitting comprises a section having a diameter tapering downwardly into a reduced diameter and flaring thereafter into a second diameter terminating in a sharp break at a line around its perimeter, the tapering and flaring producing a smooth flow path for propelling fluid flowing therealong, radially inwardly and then outwardly from the downstream end of the part length fuel rod.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides a coolant vent structure to be used alone in a bundle, in conjunction with a lower water rod, or in conjunction with a combination rod of water and fuel elements, or in conjunction with a part length fuel rod.

In the latter case, the arrangement is particularly advantageous for improving CHF performance while retaining the benefits of a part-length fuel rod. The coolant vent duct is thus located above a part-length fuel rod. The duct can include a hollow tube extension that has one or more inlet openings at a bottom thereof and one or more outlet openings at a top thereof. Accordingly, some of the reactor coolant, that is a two phase mixture, passes inside the hollow tube extension. Due to the structure of the coolant vent fuel rod, at least a partial separation of the steam and liquid of the two phase coolant that surrounds the tube is achieved by the hollow tube extension. This allows coolant with a higher steam content to bypass the upper active portions of the fuel assembly.

The structure of the present invention reduces the enthalpy rise maldistribution problem by providing active flow subchannels outside of and adjacent to the coolant vent duct that are much smaller than in the case of a part-length fuel rod without a duct. The coolant vent duct also provides an isolated inactive flow path inside of the duct so as to retain a significant part of the pressure drop reduction that occurs with a part-length rod. The coolant vent duct achieves a significant part of the part length rod pressure drop reduction because it provides most of the flow area gain that one achieves with a part-length fuel rod.

The coolant vent duct can function as a steam extraction device. Specifically, the geometry of the inlet region of the coolant vent duct can be configured to achieve significant separation of steam from water such that the coolant with the increased steam content flows inside the hollow duct while the remaining coolant with increased liquid water content continues up the active flow channels. This coolant with increased liquid water content enables generally better cooling of the nuclear fuel rods and thus enables improved CHF performance.

With either a part-length rod alone or with the coolant vent duct of the present invention, the improvement in pressure drop relative to having full length fuel rods is controllable via the number of such rods and the length of the fuel section of the rods. The trade off on whether to adjust the number or the length is made so as to yield favorable neutronics performance. The coolant vent duct of the present invention allows for fine tuning the pressure drop by using the flow holes in the coolant vent duct to meter the amount of flow that will go inside the coolant vent duct.

Figures 1, 2, 3:
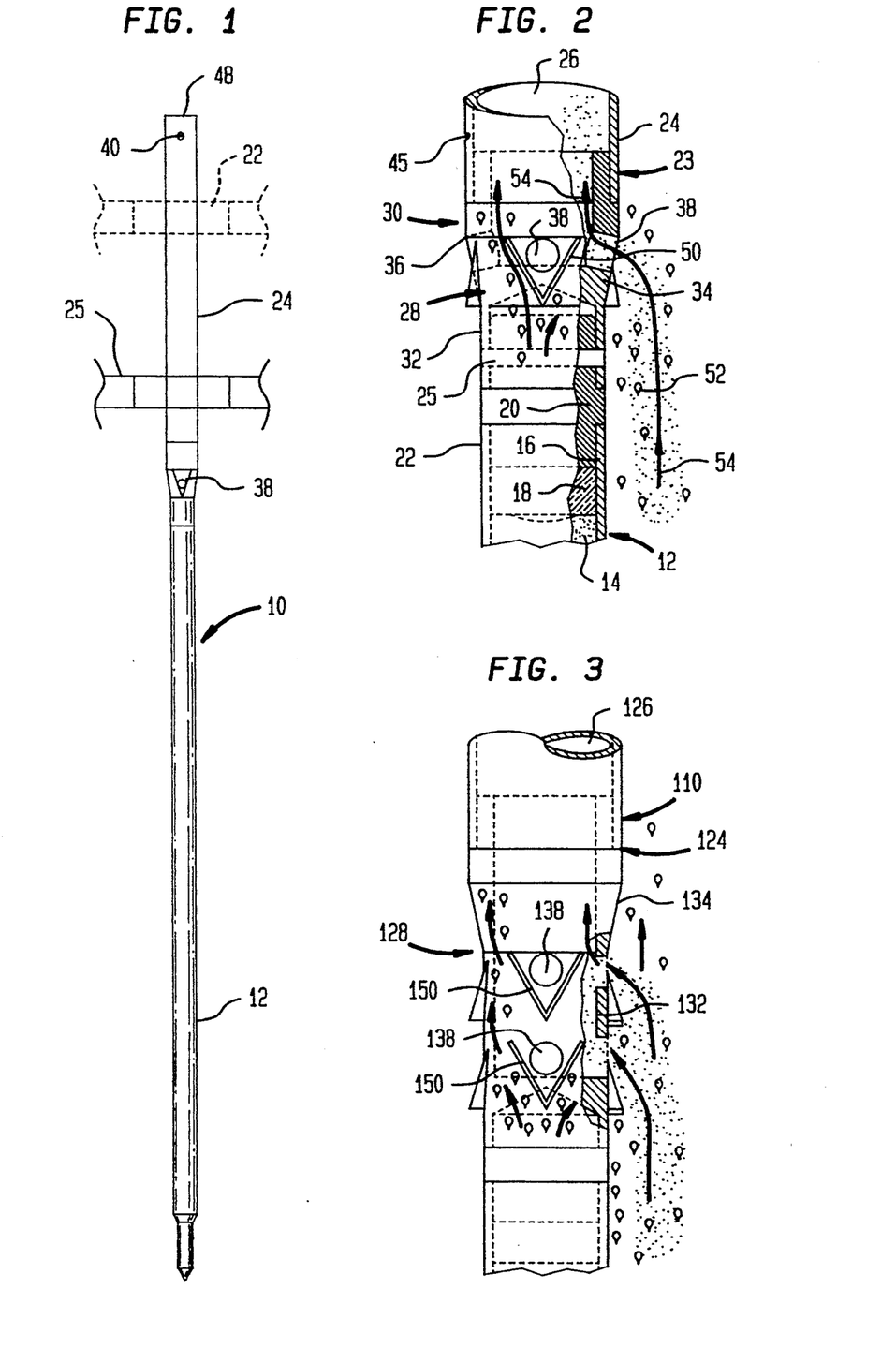
FIG. 1 illustrates a perspective view of an embodiment of a coolant vent duct and partial fuel rod of the present invention.
FIG. 2 illustrates an enlarged perspective view with parts broken away of the embodiment of a coolant vent duct illustrated in FIG. 1.
FIG. 3 illustrates an enlarged perspective view with parts broken away of another embodiment of a coolant vent duct of the present invention.

Referring now to the Figures, and specifically to FIGS. 1 and 2, an embodiment of a combination coolant vent duct and part length fuel rod 10 of the present invention is illustrated. As illustrated, a part-length fuel rod 12 is provided that includes a fuel portion 14 that is located within the cladding 16 of the rod. The upper end of the part-length fuel rod 12 includes an insulator disk 18 that can be preferably constructed from $Al_2O_3$.

Additionally, the part-length fuel rod 12 and includes a connector member 20 that is received by and extends from an end 22 of the part-length fuel rod 12. The connector member 20 allows a coolant vent duct 23 having an extension tube 24 to be coupled to the part-length fuel rod 12 and disposed axially thereto. In the preferred embodiment illustrated, a horizontal pin 25 is provided for proper rotational alignment.

Figures 8, 9:
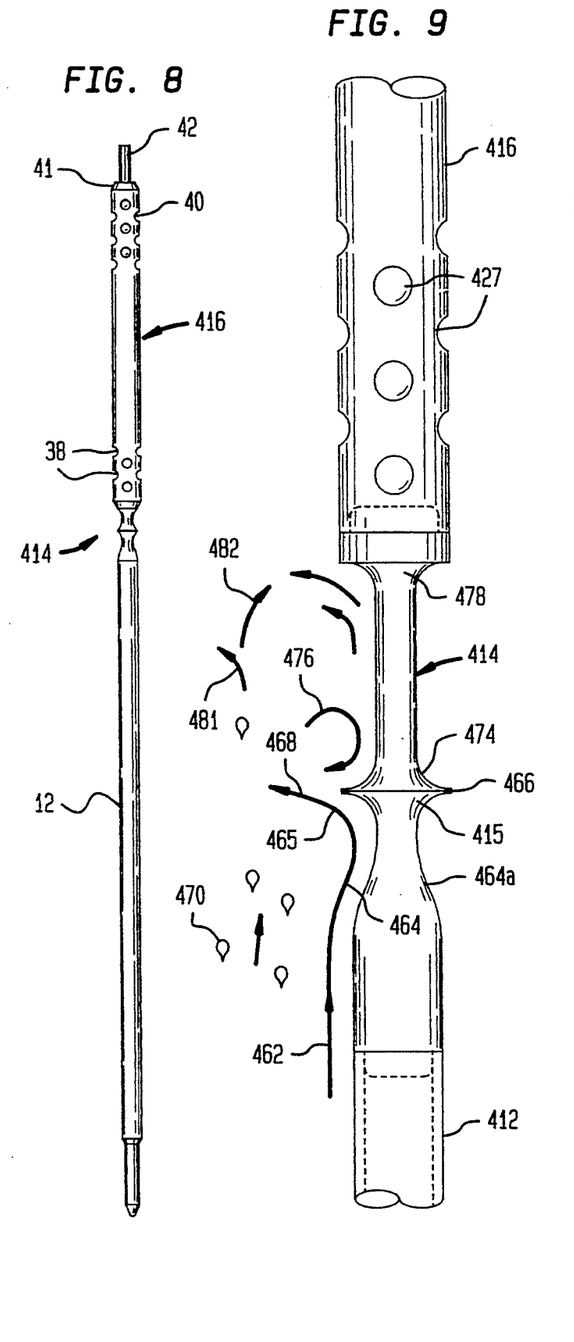
FIG. 8 illustrates a perspective view of another embodiment of a coolant vent duct of the present invention.
FIG. 9 illustrates an enlarged perspective view of a coolant vent duct inlet region of FIG. 8.

The duct 23 extends vertically to the vicinity of the upper spacer 22 shown in FIG. 1, or to some point above the upper spacer (see FIG. 8). The duct could extend all the way up to the upper tie plate (not shown) in which case there would be a means for fixing the upper end such as an upper end cap 41 and locating pin 42 (see FIG. 8). The connector member 20 may be an assemblage of smaller pieces. Among other functions the connector member 20 can serve as an upper end cap to the part length fuel rod 12 below and as a mechanical connection between the part length fuel rod 12 and the coolant vent duct 23.

The extension tube 24 includes a hollow interior 26 that provides a coolant flow path. The duct 23 also includes a transition portion 28 and an upper portion 30 formed together or bonded together. The upper portion 30 has an outer perimeter, or diameter, that is greater than the outer perimeter of the part-length fuel rod 12. Because the outer perimeter of the upper portion 30 and the tube 24 is greater than the outer perimeter of the part-length fuel rod 12, a more radial uniform enthalpy distribution among the active flow channels is achieved.

The transition portion 28 has a lower section 32 that has a substantially constant outer perimeter, and has a tapered section 34 thereabove. The tapered section 34 and lower section 32 are formed together or attached together. The lower section 32 has an outer perimeter approximately equal to the outer perimeter of the part-length fuel rod 12. The outer perimeter of the transition portion 28 increases in the tapered section 34 to a point where the upper portion 30 begins. Preferably, at the end of the transition portion 28, there is a sharp break 36 that functions to assist in stripping liquid film off the outside surface of the coolant vent fuel rod 10.

As illustrated in FIG. 2, the duct 23 can include a plurality of inlet openings 38 located in the transition portion 28. The inlet openings 38 allow a fluid to enter into the interior 26 of the extension tube 24. In a preferred embodiment, four inlet openings 38 are provided; one inlet opening 38 being aligned with each of the four subchannels that surround the combination coolant vent fuel rod 10.

At an upper portion of the extension tube 24, outlet openings 40 are provided. These outlet openings can be a grouping of openings around the tube circumference as shown in FIG. 8. The outlet openings 40 allow fluid to exit the enclosed area 26 defined by the extension tube 24.

The principle section of the extension tube 24 could be round, square, or some other shape that provides an open interior. The extension tube surface can have a local distortion 45 at certain elevations to facilitate mechanical interfacing with the spacers 22, 25 and mating with the upper portion 30 or upper end cap 41 if any.

This invention has inlet openings 38 either in the extension tube 24 or the transition portion 28 and outlet openings 40 to enable upwards flow of the reactor coolant inside of the duct 23. There may be additional openings over the length of the duct either to admit flow into or exhaust flow from the interior 26 of the duct. The openings could also be simply open end or ends of the duct such as at the top 48 of extension tube 24 shown in FIG. 1.

The mechanical connection of the lower part length fuel rod 12 and the upper tube 24 is a desirable feature but not a mandatory feature of this invention. When there is no connection the hollow tube 24 is located above a part length rod and has some means for admitting flow into the region inside the tube at the bottom and for exhausting flow at the top. The spacers provide lateral restraint when this invention is either connected or unconnected to the part length rod. When not connected to the part length rod below, vertical restraint of this invention would be provided by either the spacers or the upper tie plate. For example, locking tabs could be added to the outside surface of the tube or the tube could be distorted locally at one or more spacer elevations in such a way that if the tube is rotated 45° it would lock into place and could not be removed vertically unless rotated again. In simple form, a hollow tube is placed axially above a part length fuel rod, and serves to add hydraulic resistance in a region that would otherwise be a large open subchannel. The addition of hydraulic resistance reduces subchannel flow and thereby provides a means to correct the enthalpy rise maldistribution problem of the prior art (i.e., fuel bundles with part length fuel rods). With a simple hollow tube form of this invention either the top or bottom (or both) ends of the tube might be deformed in such a way as to exert control over the amounts of liquid water and steam flows entering the tube. A transition piece and holes in the sides of the tube may or may not be present.

In the embodiment illustrated in FIG. 2, a liquid diversion structure 50 is provided. In FIG. 2, the liquid diversion structures 50 extends outwardly from the transition portion 28, in juxtaposition to the inlet opening 38. In the embodiment illustrated, the liquid diversion structure 50 has a "V" shaped fence. Of course, other shapes and structures can be used to create a liquid diversion.

The liquid diversion structure 50, as illustrated, is so constructed and arranged that liquid, such as droplets 52 in the two phase mixture, that are near the surface as well as the liquid film on the surface, are diverted away from the inlet opening 38 while steam 54 is allowed to enter the inlet opening 38. The V-shaped fence 50 diverts the liquid film flowing up the surface of the part length rod 12 below around and away from the inlet opening 38. It also provides an obstacle for steam and liquid drop flow near the surface of the combination coolant vent fuel rod 10 that is headed for the inlet opening. This obstacle is more easily negotiated by the steam than drops. This maximizes the steam quality of the fluid flowing into the interior 26 of the extension tube 24. By causing steam to enter the extension tube 24, and therefore, exit at the outlet openings 40 or 48 of the extension tube 24, one is able to maximize the liquid available for cooling the active fuel rods while maintaining sufficient flow inside the extension tube 24 to achieve the desired reduction and bundle pressure drop.

The liquid diversion structures 50 provide at least some separation of vapor from liquid at the inlet opening 38 of the extension tube 24. This allows one to achieve a separation of the two phases as soon as practical after the fuel section of the part-length fuel rod 12.

The increased diameter or size of the upper portion 30 of the extension tube 24, with respect to the transition portion 28, also facilitates flow separating inlet designs by allowing the liquid diverting structure 50, or other protrusion, to be located in the vicinity of flow inlet openings 38 without compromising fuel loadability into the bundle. For example, as illustrated in FIG. 2, the V-shaped fence 50 does not protrude beyond the outer circumference of the extension tube 24. Hence, coolant vent duct loading is not compromised.

As set forth above, pursuant to the present invention, the transition portion 28 preferably has increasing diameter as one moves upwards and ends with a sharp break 36 to help strip off the liquid film on the outside surface of the rod. Additional film stripping means could be included over the length of the hollow tube 24 to minimize the liquid flow on the surface. The tube extension 24 could be truncated at the top spacer or it could be continued up to the upper tie plate with multiple outlet holes above the last spacer to minimize the hydraulic resistance of the flow leaving the coolant vent duct 10 (see FIG. 8).

Referring now to FIG. 3, an embodiment of the coolant vent fuel rod 110 of the present invention is illustrated. In this embodiment, inlet openings 138 are located in a transition portion 128 of this invention. In this embodiment, the openings 138 are located in a lower section 132 below a tapered section 134 of the transition portion 128. As illustrated, in this embodiment, several inlet openings 138 are located one after the other. Each opening 138 includes a liquid diversion structure 150 located in juxtaposition to the opening. Again, the structure 150 limits the liquid that enters the openings 138. In all other aspects, the coolant vent duct 110 is similar to the embodiment illustrated in FIGS. 1 and 2.

By having several inlet openings 138 one after the other, the openings provide a larger total inlet flow hole area if this is necessary to achieve sufficient flow inside the coolant vent fuel rod to achieve the necessary reduction and bundle pressure drop.

Figure 4:
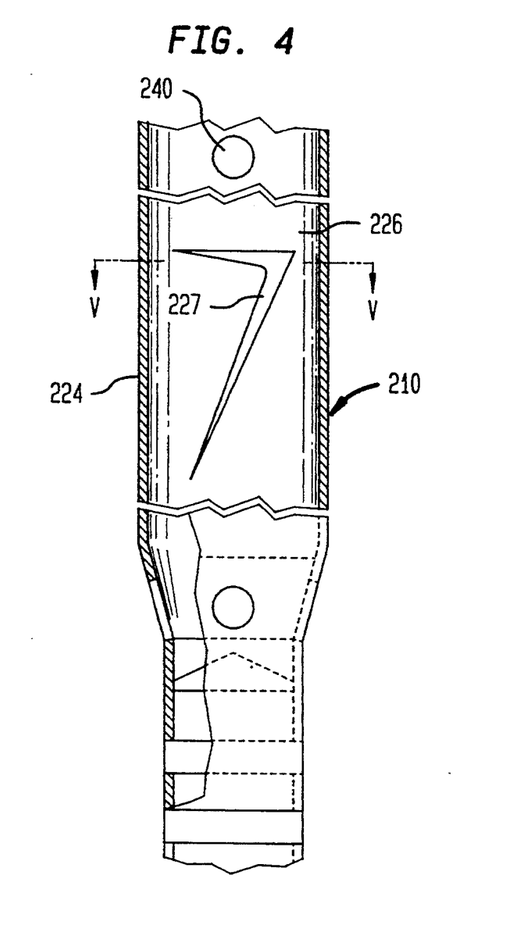
FIG. 4 illustrates a perspective view with parts broken away of another embodiment of a coolant vent duct of the present invention.
Figure 5:
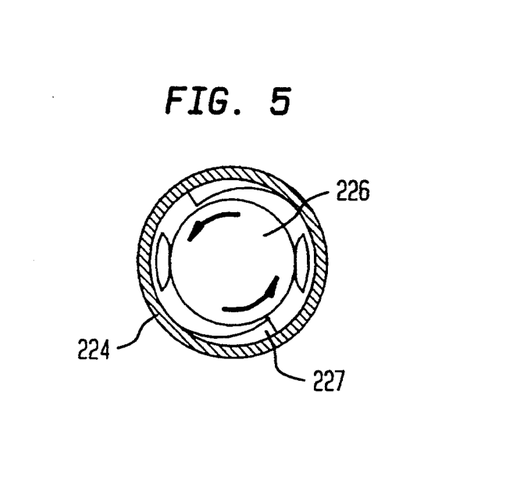
FIG. 5 illustrates a cross-sectional view of the coolant vent duct of FIG. 4 taken along lines V—V of FIG. 4.

Referring now to FIGS. 4 and 5, a further embodiment of a coolant vent duct 210 of the present invention is illustrated. In this embodiment, within an enclosed interior 226 defined by an extension tube 224, a structure 227 is located for separating water droplets from steam in the two phase mixture. Once separated, at least a portion of the separated water can be transferred to the surface of adjacent fuel rods increasing the critical heat flux (CHF) capability. To this end, openings 240 are provided along the length of the extension tube 224 to facilitate the transfer of the water that is separated to adjacent fuel rods.

The structure 227 for separating the water from the steam can be, as illustrated in FIG. 5, a device for imparting centrifugal force to the two phase mixture. In the embodiment illustrated in FIG. 5, the device includes a louver 227 that is formed into the wall of the extension tube.

Figure 6:
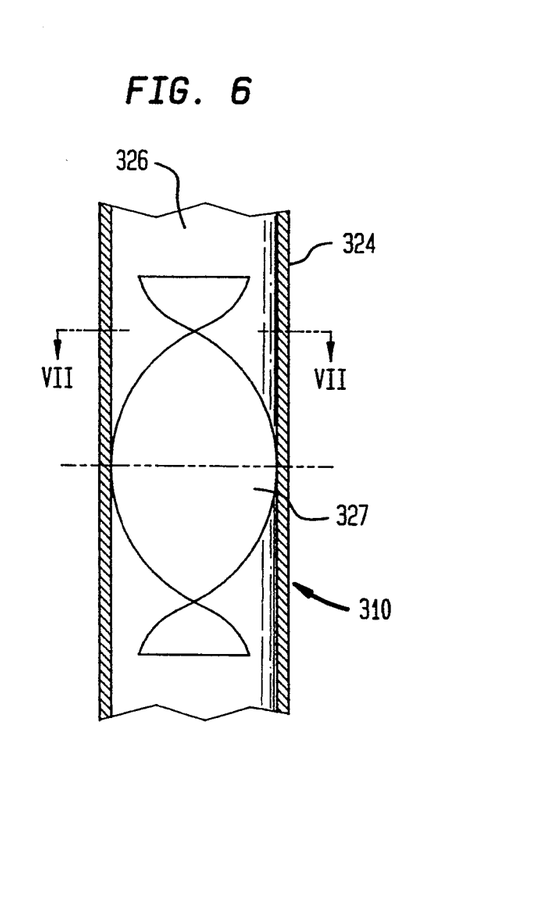
FIG. 6 illustrates a cross-sectional elevation view of another embodiment of a coolant vent duct of the present invention.
Figure 7:
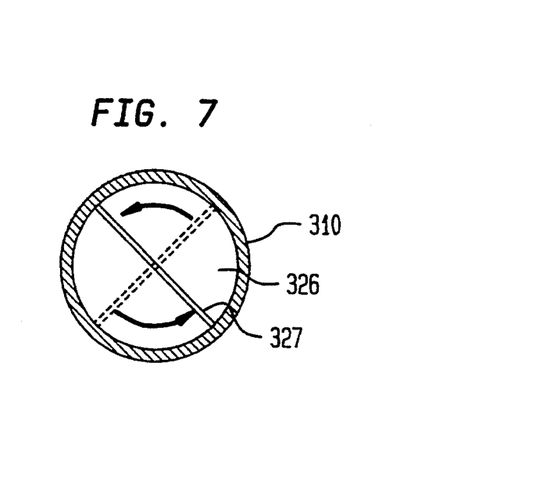
FIG. 7 illustrates a cross-sectional view of the coolant vent duct of FIG. 6 taken along lines VII—VII of FIG. 6.

Referring now to FIGS. 6 and 7, a further embodiment of the coolant vent fuel rod 310 is illustrated. In this embodiment, a structure 327 for separating steam from liquid is a twisted ribbon 327 located within an interior 326 defined by an extension tube 324. As in FIG. 4, separated water exits through one or more vent holes facilitating its transfer to adjacent fuel rods.

In addition to the internal devices for imparting centrifugal force illustrated in FIGS. 4-7, other devices and surfaces for causing agglomeration of water droplets can be used. For example, a spacer can be used. Surfaces that cause a rapid change in direction or configurations can also facilitate separation through gravity, surface tension, and other natural forces.

Referring now to FIGS. 8 and 9, there is another embodiment of the coolant vent duct. In this embodiment a connector/transition piece 414 is provided having a central flared section 415. A part length fuel rod 412 mounts axially thereon a coolant vent duct 416. Inlet holes 427 are located at the bottom end of the extension tube 416. The connector/transition piece 414 provides separation of the liquid water and steam. A liquid film 462 is shown moving up the part length rod 412 surface and onto the surface of the connector/transition piece 414. Once on the transition piece 414, this film is brought in inward direction 464 by a reduction in transition piece diameter 464a and then is rapidly redirected in radially outward direction 465. A sharp break 466 in the surface contour causes the film to separate and to continue to flow in a radially outwards direction as a thin sheet of liquid water 468. The liquid sheet of water 468 and approaching liquid drops 470 collide and outwards radial momentum is imparted to the liquid drops such that downstream of the separator device, liquid 481 is moving radially outwards while steam vapor 482 is moving inward towards the inlet holes 427. Above the outwardly flared section 415 of the transition piece 414 the diameter is again reduced 474 so that a naturally forming eddy flow 476 behind the separating sheet of liquid 468 intersects the separating sheet 468 in a more parallel fashion as opposed to a more perpendicular fashion, at the film separation point, the break 466. A second flared portion 478 of the transition connector piece 414 repeats the process for any residual liquid. If the initial flared portion 415 is not present, the second flared portion 478 becomes the primary means of directing liquid outward and away from the inlet holes 427.

The initial diameter reduction 464a at the bottom end of the transition connector piece is done smoothly so that the liquid film remains attached to the surface until it reaches the intended separation point, the break 466. The diameter is reduced ahead of the flared section so that the flared section presents a greater frontal area to the main flow stream and therefore has a greater interaction with it. The flared surfaces are rounded or curved as opposed to being straight conical or tapered surfaces so as not to impede the flowing film by trapping it in any sharp concave corners, upstream of the intended separation point 466. As shown in FIG. 9, the transition connector piece is a surface of revolution about a vertical axis down the vents. While this is easy to fabricate, sections other than round sections, for example square sections, would likely function in a satisfactory manner. Also the flared section might be sectioned into several pieces that are displaced axially from one another.

In the embodiments shown in FIGS. 8 and 9, connector/transition piece 414 which functions to separate liquid water and steam is mounted at one end to a part length fuel rod 412 and at its other end is connected to the coolant vent duct 416. As contrasted to functioning, in part, as a mechanical connection between the part length fuel rod and the coolant vent duct, the connector/transition piece can instead serve as an upper end cap of the part length fuel rod.

Figure 16:
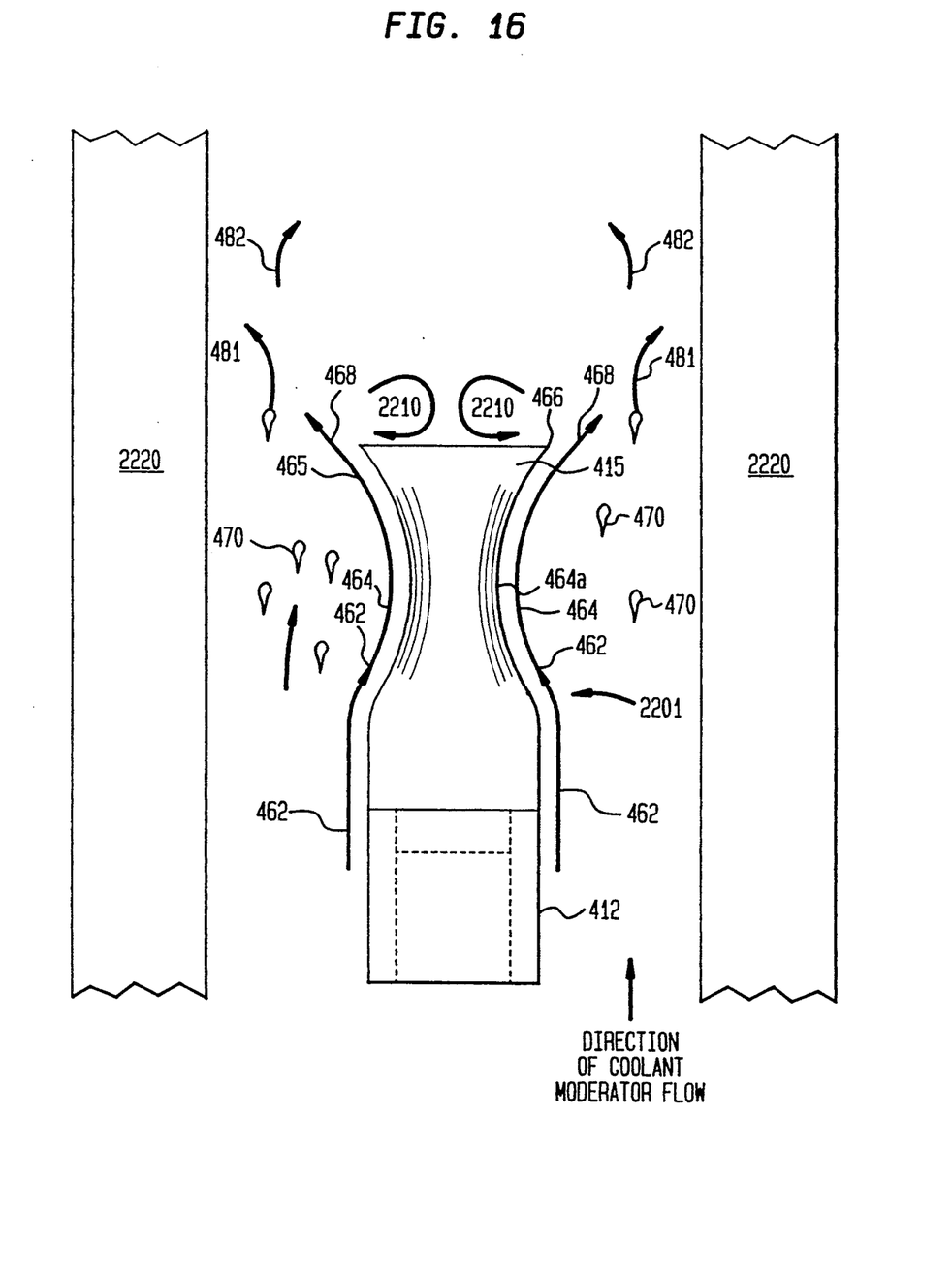
FIG. 16 illustrates an enlarged perspective view of a reflex upper end fitting connected to a part length fuel rod.

In a further embodiment of the present invention, a reflex upper end cap or fitting 2201, is connected to the part length fuel rod and is shown in FIG. 16. The reflex upper end fitting is shown connected to a part length fuel rod without using either a connector/transition piece and/or a coolant vent duct. The reflex upper end fitting has a flared section which is truncated at a sharp break. As coolant/moderator flows through the fuel assembly and along the part length fuel rod, a liquid film is formed on the surface of the part length fuel rod. The liquid film moves up the part length fuel rod and onto the reflex upper end fitting and is then directed towards surrounding fuel rods. In the case of light water reactors, upwards flowing liquid water drops in the two phase flow collide with the continuous liquid film sheet as it is moving towards the surrounding fuel rods and is imparted with an outwards radial momentum, and together with the liquid film sheet impinge upon the surrounding fuel rods. The reflex upper end fitting thus increases the amount of liquid coolant/moderator on and near the surface of the surrounding fuel rods while steam vapor flows into the large open subchannel above the top of the part length fuel rod.

Reflex upper end fitting 2201 shown in FIG. 16 is the portion of connector/transition 414 shown in FIG. 9 from and including sharp break 466 upstream to the part length fuel rod 412. FIG. 16 shows reflex upper end fitting 2201 in which corresponding elements in each of FIGS. 9 and 16 have the same reference numbers. Reflex upper end fitting 2201 is connected to part length fuel rod 412 and in the present embodiment is shown without a coolant vent duct.

As shown in FIG. 16, a single flared section 415 is truncated at sharp break 466 and liquid film 462 is shown moving up the surface of part length fuel rod 412 onto the surface of the reflex upper end cap 2201. Once on the reflex upper end cap, liquid film 462 is brought in inward direction 464 by a reduction in diameter 464a and then is rapidly redirected in radially outward direction 465. Sharp break 466 in the surface contour causes liquid film 462 to separate from the reflex upper end fitting 2201 and to continue to flow in a radially outwards direction towards the surrounding subchannels and fuel rods as a thin sheet of liquid water 468. Liquid sheet of water 468 and approaching liquid drops 470 collide in the flow stream and outwards radial momentum is imparted to liquid drops 470 such that downstream of the reflex upper end fitting 2201, liquid 481 is moving radially outwards towards the surrounding fuel rods 2220 and surrounding subchannels while steam vapor 482 concentrates in the large open subchannel above the reflex upper end fitting. After impact with water drops, sheet 468 is no longer continuous and begins to break up thereby enabling vapor to pass through it to the large open subchannel above the reflex upper end fitting.

Eddy flow 2210 is formed behind sheet 468 and intersects the sheet 468 in a parallel fashion at sharp break 466. The movement of liquid onto and around the surrounding fuel rods 2220, and the concentration of vapor in the large open subchannel above the part length fuel rod and away from surfaces of the surrounding fuel rods, results in an enthalpy reduction for the flow on and near the surface of the surrounding fuel rods.

In order to facilitate the insertion and/or removal of a part length fuel rod having a reflex upper end fitting into a fuel assembly as well as to facilitate fuel assembly fabrication, it may be desirable that the maximum outside diameter of the reflex upper end fitting not exceed that of the part length fuel rod to which it is connected. As discussed previously, in order for liquid film 462 which flows upwards on the surface of part length fuel rod 412 to separate from the surface of the end fitting as a thin continuous sheet, the reflex upper end fitting has an outwardly flared section 415 which ends in sharp break 466. In order to both facilitate fuel rod loading into a fuel assembly as well as to have the liquid film separate as a thin continuous sheet from the surface of the end fitting, the shape of the reflex upper end fitting includes a reduction in diameter 464a, upstream of outwardly flared section 415 and sharp break 466.

As a practical matter, with respect to the embodiments illustrated in FIGS. 1–3, 8 and 9, the separation of steam from water at the coolant vent duct inlet openings may be less than 100%, i.e., 100% steam may not be flowing into the interior of the coolant vent duct. Therefore, if desirable, the concepts illustrated in FIGS. 1–3, 8 and 9 and 4–7 can be combined. Accordingly, even though liquid diversion means are located on an outer wall of the extension tube, additional flow separation means can be enclosed inside the coolant vent ducts as set forth in the embodiments illustrated in FIGS. 4–7.

Further embodiments of connector/transition pieces are shown in FIGS. 10–15. These embodiments can be used alone to mount beneath a coolant vent duct or can be used such as shown in FIG. 8 to mount a coolant vent duct 416 to a part length fuel rod 12. All these embodiments can be used to mount a coolant vent duct 416 to a water rod or a water/fuel rod or the like.

Figure 10:
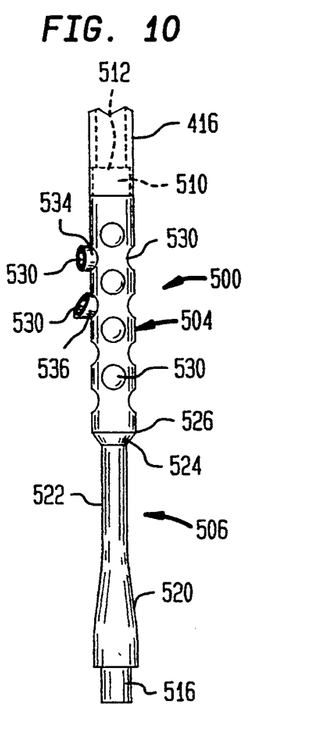
FIG. 10 illustrates a perspective view of an embodiment of the transition/connector piece of the present invention.

FIG. 10 shows a transition/connector 500 having a hollow perforated tube portion 504 mounted axially above a substantially solid connector portion 506. The hollow tube portion 504 can be fashioned having a top socket portion 510 which interfits inside the coolant vent duct 416. The socket portion 510 has a top open end 512. The connector section 506 has a bottom socket portion 516 for mechanical insertion and connection to a rod therebelow. The transition section 506 has a taper 520 in upward direction, an elongate neck portion 522 terminating in a sharp expansion 524 with a sharp break 526 at the intersection with the hollow tube portion 504. The connector 506 would behave similarly as the lower one half of the connector 414 as shown in FIG. 9.

FIG. 10 shows the hollow tube portion 504 having a plurality of holes 530 thereinto. The holes 530 can merely be openings around a circumference of the cylindrical tube wall. Optionally, the holes can have a cylindrical protruding rim 534 or a beveled protruding rim 536. These protruding rims 534, 536 or variations thereof could be applied to any of the embodiments if desired.

Figure 11:
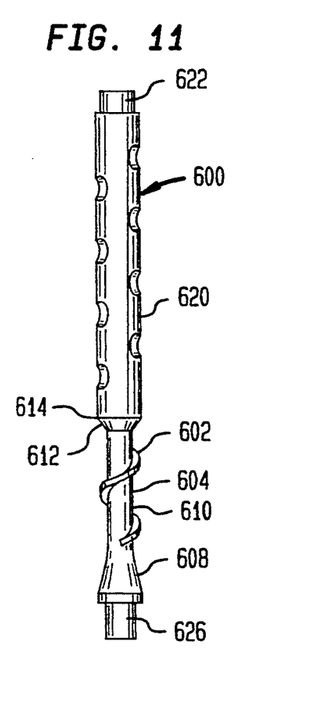
FIG. 11 illustrates a perspective view of a further embodiment of the transition/connector piece of the present invention.

The transition connector 600 shown in FIG. 11 is substantially the same as the transition connector 500 shown in FIG. 10 except that a helical fin is attached to and wound around a connector section 604. The connector section 604 provides a first taper 608, a neck section 610 and a sharp expansion 612 terminating in a sharp break 614 at an intersection between the connector section 604 and a hollow perforate tubular section 620 thereabove. The transition/connector 600 provides a open top socket 622 similar to the socket 510 in FIG. 10. A bottom socket portion 626 can be provided for connection to a rod below.

Figures 12, 13, 14, 15:
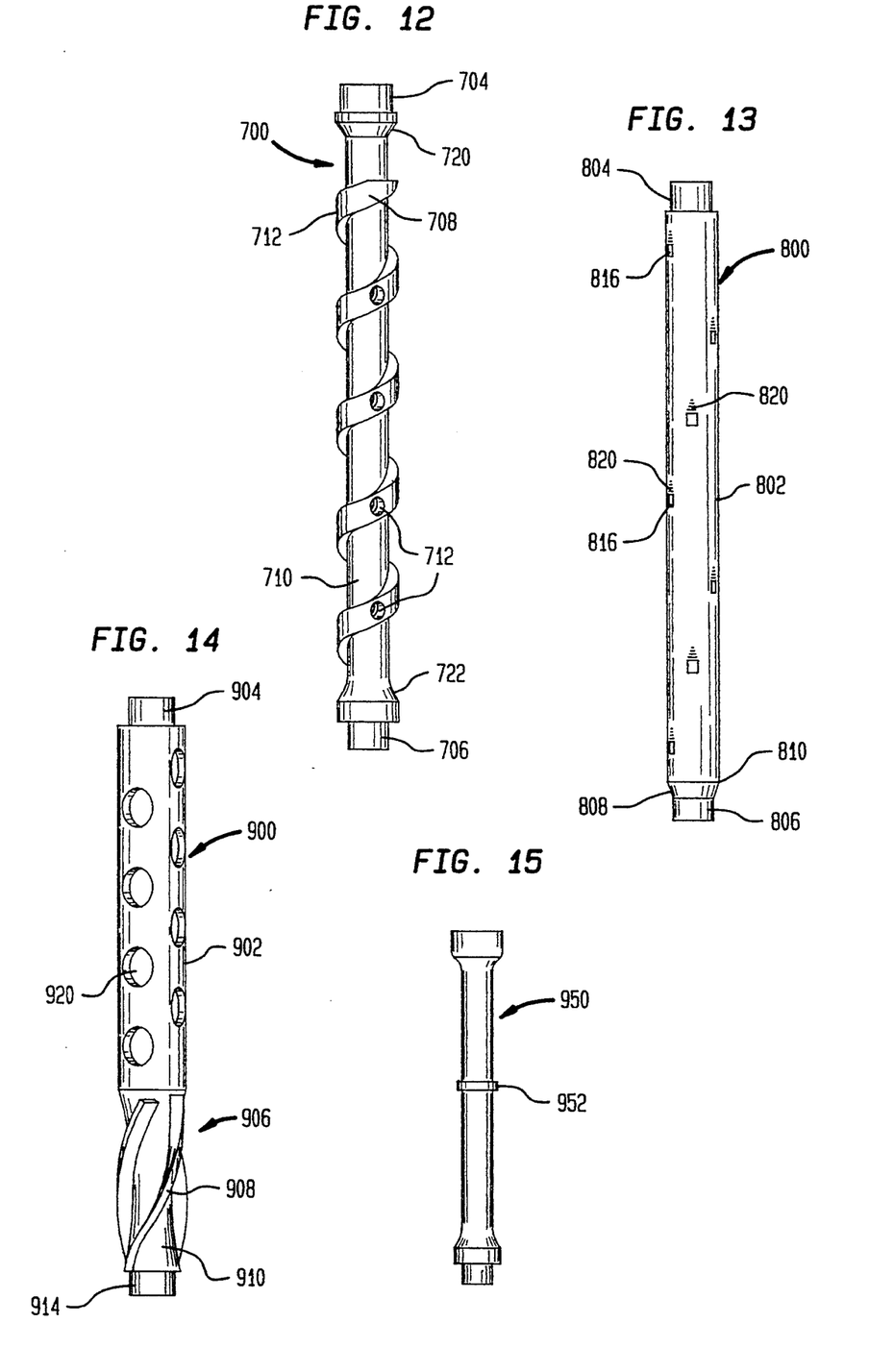
FIG. 12 illustrates a perspective view of a further embodiment of the transition/connector piece of the present invention.
FIG. 13 illustrates a perspective view of a further embodiment of the transition/connector piece of the present invention.
FIG. 14 illustrates a perspective view of a further embodiment of the transition/connector piece of the present invention.
FIG. 15 illustrates a perspective view of a further embodiment of the transition/connector piece of the present invention.

Another embodiment of the transition/connector is shown as transition/connector 700 in FIG. 12. This embodiment is similar to FIGS. 10 and 11 and can provide an open top socket 704 at a top end thereof and a mechanical connection socket 706 at a bottom end thereof. The transition connector is substantially hollow. A helical pad 708 is formed or wrapped around an elongate neck 710 of the transition/connector 700. Arranged along the helical pad 708 are openings 712. The elongate neck section 710 terminates at an upper end in a sharp expansion 720 and at a lower end in a taper 722. The opening 712 communicate into the hollow neck section 710 where steam vapor can be carried upward through the elongate neck section 710 and out of the open top socket 704 into a coolant vent duct 416 arranged thereabove (not shown).

Another embodiment of a transition/connector 800 is shown in FIG. 13. In this embodiment a substantially hollow neck section 802 has an open top socket portion 804 for interfitting into a coolant vent duct 416 thereabove (not shown). A bottom socket 806 is provided for mechanical interconnection with a rod below. Adjacent the socket 806 is a sharp expansion 808 and a sharp break 810 into the hollow neck section 802. A plurality of openings 816, in this embodiment shown as square, are provided. Above each opening is a cone-shaped depression 820 which tapers down in upward direction to the surface of the elongate neck section 802.

Another embodiment of a transition/connector 900 is shown in FIG. 14. In this embodiment, a perforated hollow tube section 902 having a top socket with an open top 904 thereabove is mounted axially above a connecting portion 906 having a plurality of helical veins 908 arranged protruding from a tapered neck section 910. The tapered neck section tapers inwardly from its bottom to a central area and outwardly thereafter up into hollow tube portion 902. An attachment socket 914 is provided below the neck section 910. The hollow tube portion 902 is provided with openings 920 for inlet of steam to progress upwardly inside the tube portion 902, out of the top socket 904 into a coolant vent duct 416 mounted thereabove (not shown).

Another embodiment of a connection portion 950 is shown in FIG. 15. In this embodiment, the connector 414 of FIG. 9 is elongated and means for separating the upwards flowing liquid surface film is a ridge 952.

The embodiments for the connector/transition pieces shown in FIGS. 10-15 could also be used in combination with the embodiments of FIGS. 4-7, thus providing liquid diversion means on both an outside and on an inside of the transition/connection piece or the coolant vent duct.

The present inventive coolant vent duct need not be associated with a part-length fuel rod. It could be used in conjunction with a water rod or some combination of water and fuel elements. A bundle containing one or more coolant vent ducts can use these ducts in conjunction with water rods, water channels, and the like. The inlet elevation of the coolant vent duct can be at any elevation along the active length of the bundle where there is available steam to be separated from liquid coolant. A coolant vent duct bundle can contain one or more individual coolant vent ducts whose design need not all be identical. For example, each coolant vent duct in the bundle might have a different inlet elevation. The shape of inlet and outlet openings can be various. Examples of inlets are round holes, rectangular holes, or openings of some other regular or irregular shape. The surface of the duct can be distorted in the vicinity of the inlets to enhance separation of steam from liquid, or to reduce pressure drops.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A fuel rod for a light water reactor fuel assembly having elongated fuel rods, comprising:
   (a) a part length fuel rod portion containing nuclear fuel, the part length fuel rod portion having a downstream end;
   (b) a reflex upper end fitting for separating at least a portion of the liquid and the vapor of two phase flow, the reflex upper end fitting disposed axially above the part length fuel rod and in contact with the downstream end of the part length fuel rod, the reflex upper end fitting comprising:
      a section having a diameter tapering downwardly into a reduced diameter and flaring thereafter into a second diameter terminating in a sharp break at a line around its perimeter, the tapering and flaring producing a smooth flow path for propelling fluid flowing therealong, radially inwardly and then outwardly from the downstream end of the part length fuel rod.

2. A nuclear reactor fuel assembly comprising:
   (a) a part length fuel rod;
   (b) a plurality of generally substantially parallel disposed elongated fuel rods, the part length fuel rod and plurality of fuel rods arranged in spaced parallel relation;
   (c) means for supporting the fuel rods and the part length fuel rod in the spaced parallel relation;
   (d) a reflex upper end fitting for separating at least a portion of the liquid and the vapor of two phase flow, the reflex upper end fitting disposed axially above the part length fuel rod and in contact with the downstream end of the part length fuel rod, the reflex upper end fitting comprising a section having a diameter tapering downwardly into a reduced diameter and flaring thereafter into a second diameter terminating in a sharp break at a line around its perimeter, the tapering and flaring producing a smooth flow path for propelling fluid flowing therealong, radially inwardly and then outwardly from the downstream end of the part length fuel rod; and
   (e) connecting means for connecting the reflex upper end fitting to the part length fuel rod.

* * * * *